(12) United States Patent
You et al.

(10) Patent No.: US 11,813,584 B2
(45) Date of Patent: Nov. 14, 2023

(54) COMBINED REFORMING APPARATUS

(71) Applicant: DOOSAN ENERBILITY CO., LTD, Changwon (KR)

(72) Inventors: Su Nam You, Yongin (KR); Bong Keun Kim, Yongin (KR); Gyeong Mo Nam, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 2 days.

(21) Appl. No.: 17/548,573

(22) Filed: Dec. 12, 2021

(65) Prior Publication Data
US 2023/0107936 A1 Apr. 6, 2023

(30) Foreign Application Priority Data

Oct. 6, 2021 (KR) .................. 10-2021-0132413

(51) Int. Cl.
*B01J 19/24* (2006.01)
*C01B 3/38* (2006.01)

(52) U.S. Cl.
CPC ......... *B01J 19/2425* (2013.01); *B01J 19/243* (2013.01); *C01B 3/382* (2013.01); *C01B 3/384* (2013.01); *B01J 2219/00081* (2013.01); *B01J 2219/00092* (2013.01); *C01B 2203/0233* (2013.01); *C01B 2203/0811* (2013.01)

(58) Field of Classification Search
CPC ........ B01J 19/00; B01J 19/24; B01J 19/2415; B01J 19/2425; B01J 19/243; B01J 2219/00; B01J 2219/00049; B01J 2219/00051; B01J 2219/00074; B01J 2219/00076; B01J 2219/00081; B01J 2219/00087; B01J 2219/00092; C01B 3/00; C01B 3/02; C01B 3/32; C01B 3/38; C01B 3/382; C01B 3/384; C01B 2203/00; C01B 2203/02; C01B 2203/0205; C01B 2203/0227; C01B 2203/0233; C01B 2203/08; C01B 2203/0805; C01B 2203/0811

See application file for complete search history.

(56) References Cited

U.S. PATENT DOCUMENTS

2003/0054213 A1* 3/2003 Ishikawa ................. C01B 3/384
422/600
2008/0247942 A1* 10/2008 Kandziora .............. C01B 3/384
422/198

FOREIGN PATENT DOCUMENTS

KR 10-2004-0012890 A 2/2004

OTHER PUBLICATIONS

An OA dated Mar. 8, 2023 by the PTO(KR).

* cited by examiner

*Primary Examiner* — Natasha E Young
(74) *Attorney, Agent, or Firm* — Harvest IP Law, LLP

(57) ABSTRACT

A combined reforming apparatus is provided. The combined reforming apparatus includes a body, a first catalyst tube disposed inside the body and reacting at a first temperature to reform hydrocarbons ($C_xH_y$) having two or more carbon atoms into methane ($CH_4$), a second catalyst tube disposed inside the body, connected to the first catalyst tube, and reacting at a second temperature higher than the first temperature to reform methane ($CH_4$) into synthesis gas comprising hydrogen ($H_2$) and carbon monoxide (CO), and a combustion unit configured to supply heat to the first and second catalyst tubes.

19 Claims, 9 Drawing Sheets

COMBINED REFORMING APPARATUS

CROSS REFERENCE TO RELATED APPLICATION

This application claims priority to Korean Patent Application No. 10-2021-0132413, filed on Oct. 6, 2021, the disclosure of which is incorporated herein by reference in its entirety.

BACKGROUND

1. Field

Apparatuses and methods consistent with exemplary embodiments relate to a combined reforming apparatus, and more particularly, to a combined reforming apparatus including two or more catalyst tubes reacting at different temperatures to reform hydrocarbons ($C_xH_y$) having two or more carbon atoms into methane ($CH_4$) and reform methane ($CH_4$) into synthesis gas composed of hydrogen ($H_2$) and carbon monoxide (CO).

2. Description of the Related Art

A related art steam methane reformer (SMR) is an apparatus for reforming natural gas containing methane ($CH_4$) as a main component. The related art steam methane reformer has a problem in that the structure and process are complicated because a preliminary reformer for reforming high carbon-number hydrocarbons into methane is required when reforming a gas containing a hydrocarbon ($C_xH_y$) having a high carbon number.

SUMMARY

Aspects of one or more exemplary embodiments provide a combined reforming apparatus including two or more catalyst tubes reacting at different temperatures, thereby reforming hydrocarbons ($C_xH_y$) having two or more carbon atoms into methane ($CH_4$) and reforming methane ($CH_4$) into synthesis gas composed of hydrogen ($H_2$) and carbon monoxide (CO).

Additional aspects will be apparent in part in the description which follows and, in part, will become apparent from the description from the following description, or may be learned by practice of the exemplary embodiments.

According to an aspect of an exemplary embodiment, there is provided a combined reforming apparatus including: a body; a first catalyst tube disposed inside the body and reacting at a first temperature to reform hydrocarbons having two or more carbon atoms into methane ($CH_4$); a second catalyst tube disposed inside the body, connected to the first catalyst tube, and reacting at a second temperature higher than the first temperature to reform methane ($CH_4$) into synthesis gas comprising hydrogen ($H_2$) and carbon monoxide (CO); and a combustion unit configured to supply heat to the first and second catalyst tubes.

Pyrolysis gas generated through pyrolysis of waste and steam may be supplied to the first catalyst tube.

Combustion gas discharged from the combustion unit may supply heat to the second catalyst tube and then to the first catalyst tube.

The combustion gas may be discharged through a center portion of the body.

The second catalyst tube may be radially more inner than the first catalyst tube.

The first catalyst tube and the second catalyst tube may be arranged in parallel along a longitudinal direction of the body, and a first wall extending from a first side of the body is disposed between the first catalyst tube and the second catalyst tube.

A second wall extending from a second side of the body may be disposed more inward than the second catalyst tube.

The first catalyst tube may include a plurality of first catalyst tubes and the second catalyst tube may include a plurality of second catalyst tubes.

The plurality of second catalyst tubes may be arranged at intervals along a circumferential direction of the body, and the plurality of first catalyst tubes may be arranged to surround the plurality of second catalyst tubes.

The number of the plurality of first catalyst tubes may be equal to the number of the plurality of second catalyst tubes, and the plurality of first catalyst tubes may be connected to the plurality of second catalyst tubes, respectively.

The first catalyst tube may have a U-curved portion.

The U-curved portion may extend along a circumferential direction of the body.

The second catalyst tube may have a U-curved portion, the U-curved portion extending along a circumferential direction of the body.

The body may include a combustion gas discharge unit through which the combustion gas is discharged outside.

The second catalyst tube may be connected to a synthesis gas discharge unit through which the synthesis gas is discharged outside.

The synthesis gas discharge unit may be in contact with the first catalyst tube to perform heat exchange with the first catalyst tube.

The combined reforming apparatus may further include a spiral heat exchange tube configured to be wound around an outer circumferential surface of the body or to be wound around an inner circumferential surface of the body.

Hydrocarbon gas and steam may be supplied to the spiral heat exchange tube, move spirally through the spiral heat exchange tube, and then flow into the first catalyst tube.

The hydrocarbon gas and steam may be heated before being introduced into the first catalyst tube by exchanging heat with combustion gas existing in the body while moving through the spiral heat exchange tube.

The second catalyst tube may be a double tube comprising an outer tube and an inner tube that communicates with the outer tube and is disposed inside the outer tube According to one or more exemplary embodiments, because the combined reforming apparatus includes two or more catalyst tubes reacting at different temperatures, hydrocarbons ($C_xH_y$) having two or more carbon atoms can be reformed into methane ($CH_4$) and the methane ($CH_4$) can be reformed into synthesis gas composed of hydrogen ($H_2$) and carbon monoxide (CO). Accordingly, there is no need to additionally install a preliminary reformer, thereby simplifying the structure and process for gas reforming.

In addition, because the first catalyst tube or the second catalyst tube has at least one U-curved portion depending on a required time for gas reforming, it is possible to reduce the total reaction time.

In addition, it is possible to heat the hydrocarbon gas and steam supplied to the first catalyst tube using waste heat of combustion gas or synthesis gas.

Further, one or more exemplary embodiments can be used for reforming pyrolysis gas generated during pyrolysis of wastes, in which the pyrolysis gas contains a large amount of hydrocarbons having two or more carbon atoms.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
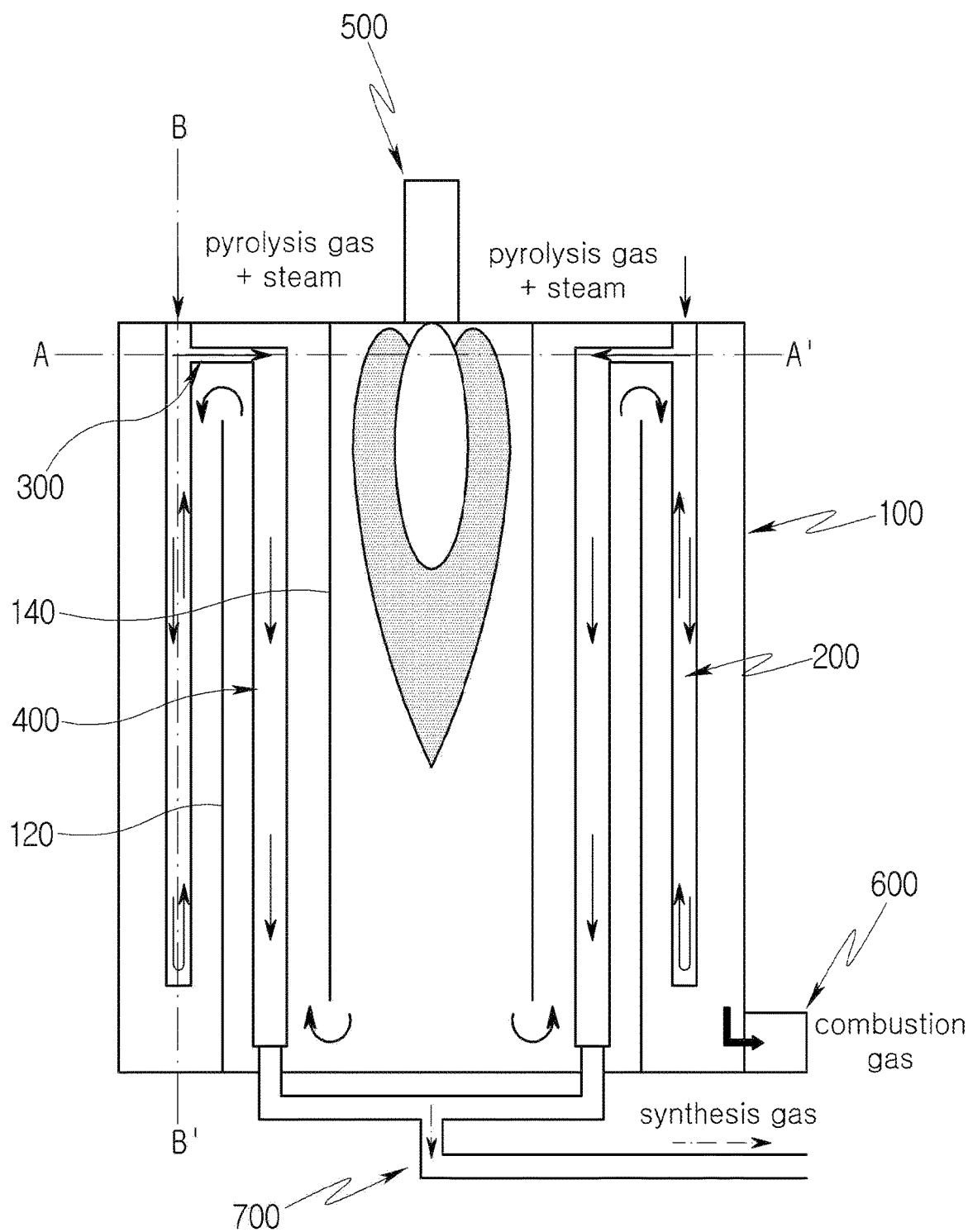
FIG. 1 is a cross-sectional view illustrating a combined reforming apparatus according to a first exemplary embodiment.

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
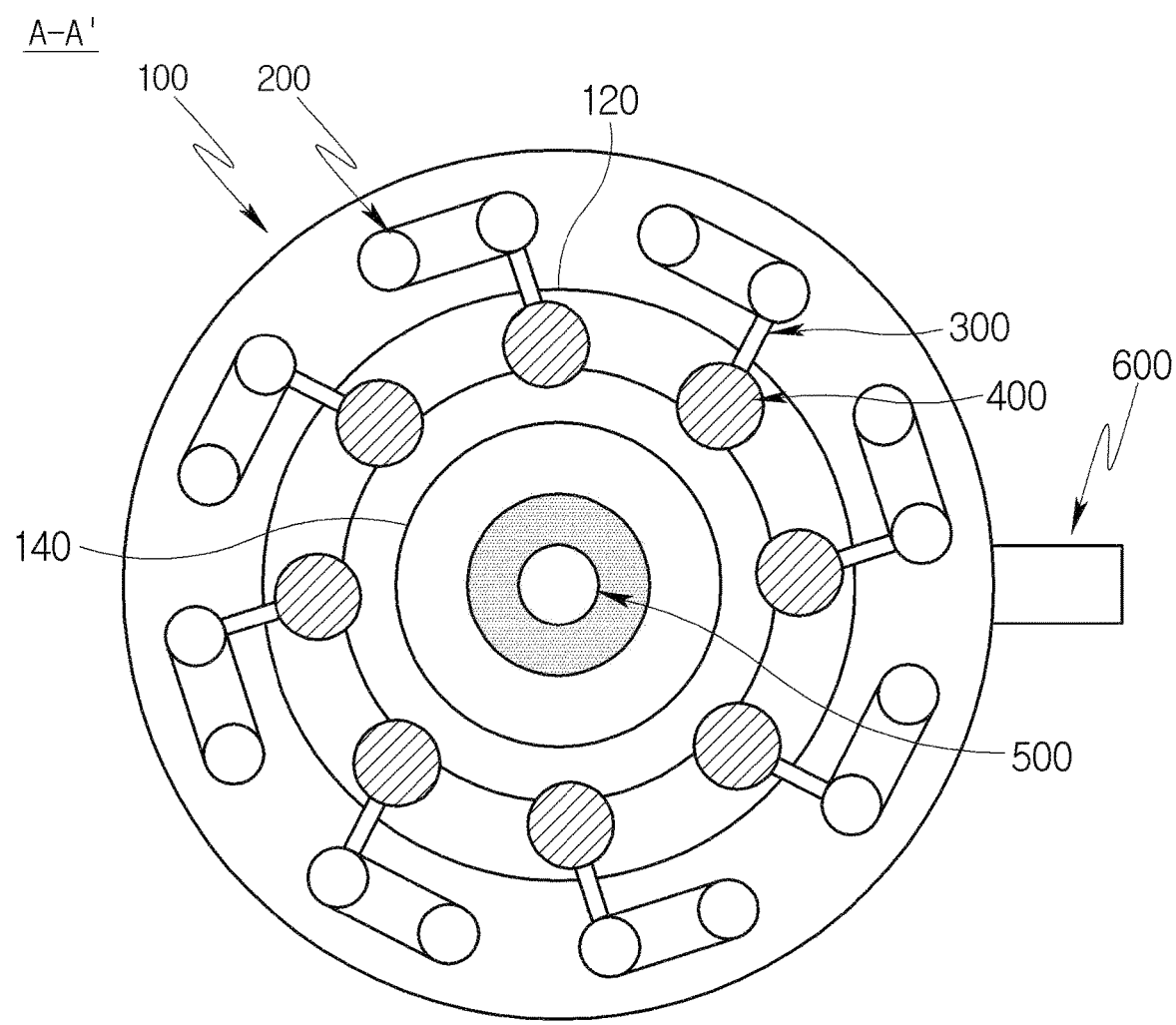
FIG. 2 is a cross-sectional view taken along line A-A' of FIG. 1.
Figure 3:
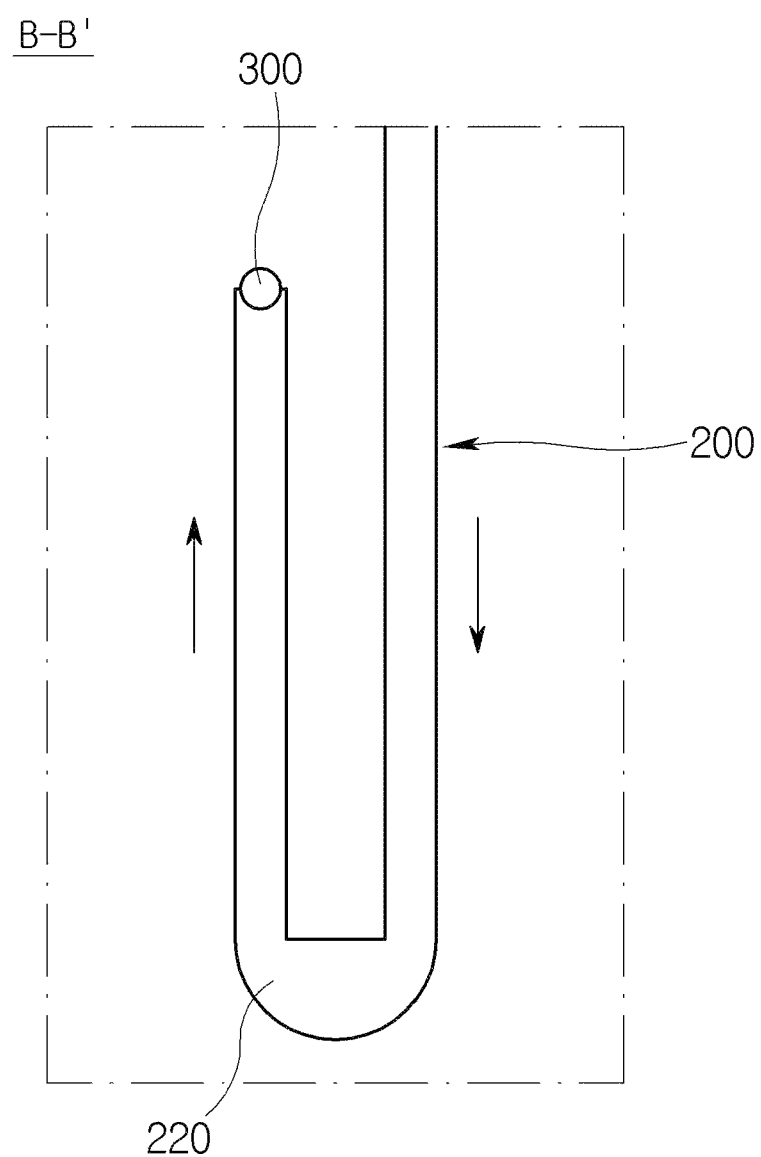
FIG. 3 is a cross-sectional view taken along line B-B' of FIG. 1.

Hereinafter, a combined reforming apparatus according to a first exemplary embodiment will be described with reference to the accompanying drawings. FIG. 1 is a cross-sectional view illustrating a combined reforming apparatus according to a first exemplary embodiment. FIG. 2 is a cross-sectional view taken along line A-A' of FIG. 1. FIG. 3 is a cross-sectional view taken along line B-B' of FIG. 1.

Referring to FIGS. 1 to 3, a combined reforming apparatus includes a body 100, a first catalyst tube 200, an intermediate tube 300, a second catalyst tube 400, a combustion unit 500, a combustion gas discharge unit 600, and a synthesis gas discharge unit 700.

The body 100 is formed in a cylindrical shape having an inner space to define an external shape of the combined reforming apparatus. However, it is understood that the shape of the body 100 is not limited to the cylindrical shape.

Two or more catalyst tubes containing different catalysts reacting at different temperatures are disposed in the body 100. For example, the first catalyst tube 200 is used to reform hydrocarbons ($C_xH_y$) having two or more carbon atoms into methane ($CH_4$), and the second catalyst tube 400 is used to reform methane ($CH_4$) into synthesis gas containing hydrogen ($H_2$) and carbon monoxide (CO). The first catalyst tube 200 reacts at a first temperature T1, and the second catalyst tube 400 reacts at a second temperature T2 higher than the first temperature T1.

The first temperature T1, which is the reaction temperature of the first catalyst tube 200, may be about 350° C. to 550° C., and a catalyst for reforming hydrocarbons having two or more carbon atoms is used. For example, a nickel-based catalyst using MgO or $Al_2O_3$ or a combination thereof as a support may be used for the first catalyst tube 200. Accordingly, in the first catalyst tube 200, higher hydrocarbons having two or more carbon atoms, such as ethane, propane, and butane, may be converted into methane, carbon monoxide, and hydrogen through reactions represented by Reaction Formulas 1 and 2 below.

$$C_nH_m + nH_2O \rightarrow nCO + (n+m/2)H_2 \quad \text{Reaction Formula 1:}$$

$$CO + 3H_2 \rightarrow CH_4 + H_2O \quad \text{Reaction Formula 2:}$$

The second temperature T2, which is the reaction temperature of the second catalyst tube 400, may be about 700° C. to 900° C., and a catalyst for reforming methane is used. For example, a nickel-based catalyst may also be used for the second catalyst tube 400. Accordingly, in the second catalyst tube 400, methane may be converted into synthesis gas mainly composed of hydrogen and carbon monoxide through a reaction represented by Reaction Formula 3 below.

$$CH_4 + H_2O \rightarrow CO + 3H_2 \quad \text{Reaction Formula 3:}$$

The first catalyst tube 200 and the second catalyst tube 400 are connected through the intermediate tube 300 so that hydrocarbon gas and steam supplied to the first catalyst tube 200 flow sequentially through the first catalyst tube 200, the intermediate tube 300, and the second catalyst tube 400.

Accordingly, although the hydrocarbon gas supplied to the first catalyst tube 200 contains a large amount of hydrocarbons having two or more carbon atoms, the pyrolysis gas can be reformed into synthesis gas through steam reforming reactions while sequentially passing through the first catalyst tube 200 and the second catalyst tube 400. That is, higher hydrocarbons having two or more carbon atoms may be converted into methane while passing through the first catalyst tube 200, and methane may be converted into synthesis gas while passing through the second catalyst tube 400. Here, the hydrocarbon gas supplied to the first catalyst tube 200 may be a pyrolysis gas generated by thermally decomposing wastes. For example, the hydrocarbon gas may be a pyrolysis gas generated by thermally decomposing waste plastics, and may include a large amount of hydrocarbons having two or more carbon atoms.

The combustion unit 500 for supplying heat to the first catalyst tube 200 and the second catalyst tube 400 is installed in an upper center of the body 100. In the combustion unit 500, the hydrocarbon gas is combusted to generate combustion gas. The generated combustion gas is discharged to an outside through the center of the body 100.

Because the second catalyst tube 400 reacts at a higher temperature than the first catalyst tube 200, the combustion gas discharged from the combustion unit 500 first supplies heat to the second catalyst tube 400, and then supplies heat to the first catalyst tube 200. To this end, the second catalyst tube 400 is positioned radially inside the body 100 rather than the first catalyst tube 200. Referring to FIG. 2, the first catalyst tube 200 and the second catalyst tube 400 may include a plurality of first catalyst tubes 200 and a plurality of second catalyst tubes 400. The plurality of second catalyst tubes 400 are arranged at intervals in a circumferential direction of the body 100. FIG. 2 illustrates a case in which eight second catalyst tubes 400 are spaced apart from each other at regular intervals along the circumferential direction of the body 100, but it is understood that this is only an example and other exemplary embodiments are not limited thereto. Also, the plurality of first catalyst tubes 200 are spaced apart from each other along the circumferential direction of the body 100 and are disposed to surround the plurality of second catalyst tubes 400. The plurality of first catalyst tubes 200 and the plurality of second catalyst tubes 400 extend vertically along a longitudinal direction of the body 100.

The number of the first catalyst tubes 200 may be equal to the number of the second catalyst tubes 400, and the first catalyst tubes 200 and the second catalyst tubes 400 may be connected one-to-one. Therefore, the number of the intermediate tubes 300 is the same as the number of the first catalyst tubes 200 and as the number of the second catalyst tubes 400. For example, eight first catalyst tubes 200 are arranged to surround eight second catalyst tubes 400, and the eight first catalyst tubes 200 are connected to the eight second catalyst tubes 400 through eight intermediate tubes 300. However, it is understood that this is only an example and other exemplary embodiments are not limited thereto. Alternatively, the number of the second catalyst tubes 400 may be greater than the number of the first catalyst tubes 200 so that each first catalyst tube 200 may be connected to a plurality of second catalyst tubes 400.

Referring to FIG. 3, the first catalyst tube 200 has a U-curved portion 220. For example, each of the plurality of first catalyst tubes 200 extends vertically downward from an upper side of the body 100, then curves in a U shape at a lower end (i.e., U-curved portion 220), and then extends vertically upward. The number of U-curved portions 220 may be adjusted according to a catalyst reaction time. As the required catalyst reaction time increases, the number of U-curved portions 220 may increase.

It is preferable that the U-curved portion 220 extends along the circumferential direction of the body 100. That is, the vertically extending portions in each of the plurality of first catalyst tubes 200 are positioned at the same radial distance from the center of the body 100. Accordingly, the length of the first catalyst tube 200 can be adjusted according to the required catalyst reaction time, and a combined reforming apparatus can be formed in a compact configuration. In addition, each of the plurality of second catalyst tubes 400 may also have a U-curved portion.

Figure 4:
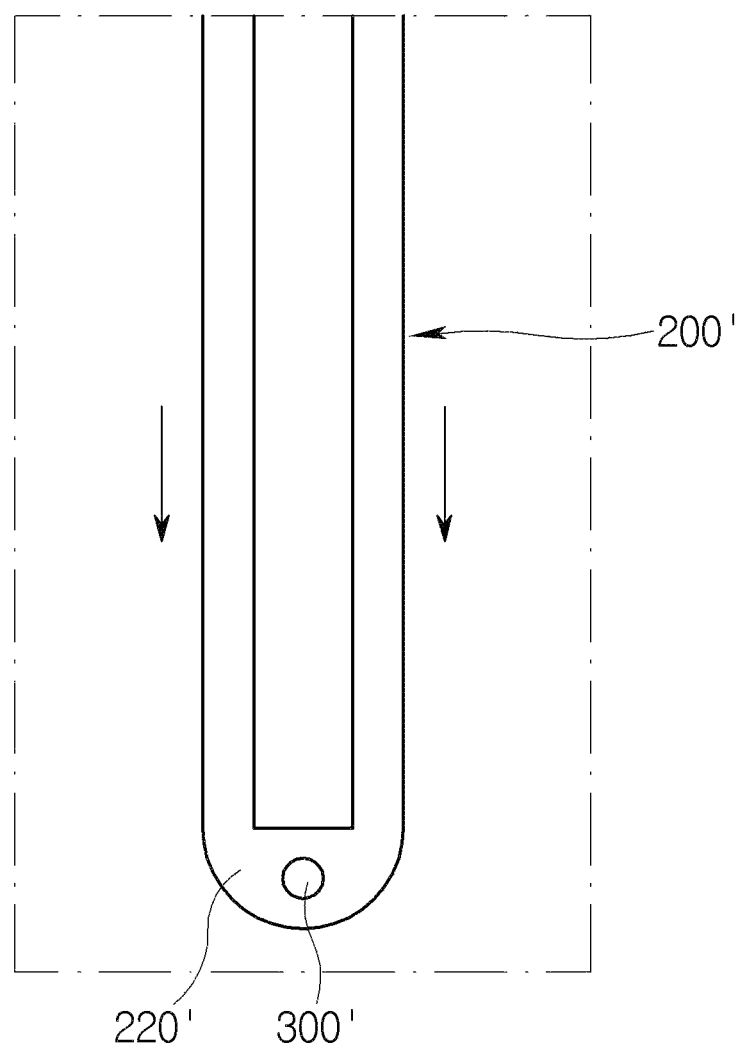
FIG. 4 is a cross-sectional view illustrating another example of FIG. 3.

Here, a first end of the intermediate tube 300 is connected to the first catalyst tube 200, and a second end of the intermediate tube 300 is connected to the second catalyst tube 400. Therefore, the hydrocarbon gas and steam supplied to the first catalyst tube 200 passes sequentially through the U-curved portion 220, the end of the first catalyst tube 200, the intermediate tube 300, and the second catalyst tube 400. FIG. 4 is a cross-sectional view illustrating another example of FIG. 3

However, it is understood that this is just an example and one or more other exemplary embodiments are not limited thereto. For example, according to another exemplary embodiment as illustrated in FIG. 4, one end of the intermediate tube 300' may be connected to a U-curved portion 220' of the first catalyst tube 200'. Therefore, hydrocarbon gas and steam are introduced into the U-curved portion 220' from both sides thereof, respectively, and meet in the U-curved portion 220'. Thereafter, the hydrocarbon gas and the steam may flow together through the intermediate tube 300' and the second catalyst tube 400.

Referring to FIG. 2, a first wall 120 and a second wall 140 are provided in the body 100. The first and second walls 120 and 140 guide the flow of the combustion gas discharged from the combustion unit 500 to effectively supply heat to the first catalyst tubes 200 and the second catalyst tubes 400. The first wall 120 is provided between the first catalyst tube 200 and the second catalyst tube 400, and vertically extends upwardly from the lower side of the body 100. The second wall 140 is disposed inside the second catalyst tube 400 in the radial direction, and extends vertically downward from the upper side of the body 100. Accordingly, the combustion gas discharged from the combustion unit 500 flows in a zigzag direction along the longitudinal direction of the first catalyst tube 200 and the second catalyst tube 400, thereby supplying sufficient heat to the first and second catalyst tubes 200 and 400 and generating a temperature gradient in the first and second catalyst tubes 200 and 400. The first catalyst tube 200 and/or the second catalyst tube 400 may be provided with fins to improve heat transfer efficiency.

Referring to FIG. 1, the combustion gas discharged from the combustion unit 500 flows downward, passes through a space under the second wall 140, flows through the second catalyst tube 400, and flows upward to supply heat to the second catalyst tube 400. Thereafter, the combustion gas that is slightly cooled to heat the second catalyst tube 400 passes a space above the first wall 120 and flows toward the first catalyst tube 200 to provide heat to a next first catalyst tube 200. After supplying heat to the first catalyst tube 200 and the second catalyst tube 400, the combustion gas is discharged to the outside by the combustion gas discharge unit 600 provided in the body 100.

As described above, the hydrocarbon gas sequentially flows through the first catalyst tube 200 and the second catalyst tube 400 and may be reformed into synthesis gas through steam reforming. The synthesis gas discharge unit 700 for discharging synthesis gas is connected to the second catalyst tube 400. The synthesis gas discharge unit 700 may collect the synthesis gas generated by the plurality of second catalyst tubes 400 and discharge the synthesis gas to the outside.

Figure 5:
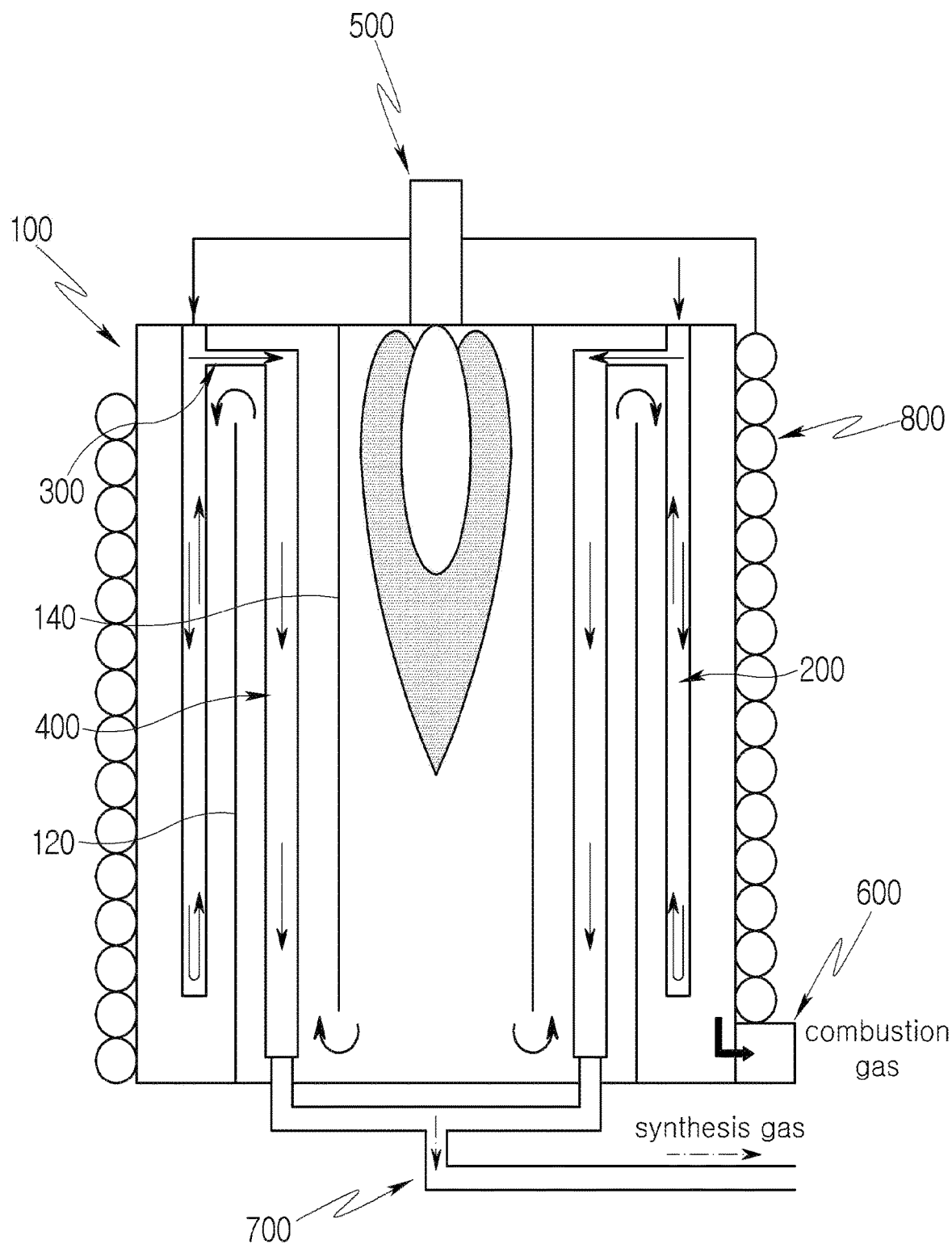
FIG. 5 is a cross-sectional view illustrating a combined reforming apparatus according to a second exemplary embodiment.

FIG. 5 is a cross-sectional view illustrating a combined reforming apparatus according to a second exemplary embodiment.

Referring to FIG. 5, because the combined reforming apparatus according to the second exemplary embodiment has the same structure as the combined reforming apparatus according to the first exemplary embodiment except for a spiral heat exchange tube 800, a redundant description of the same configuration will be omitted. For example, the spiral heat exchange tube 800 may be wound around an outer circumferential surface of the body 100. Alternatively, the spiral heat exchange tube 800 may be wound around an inner circumferential surface of the body 100.

The hydrocarbon gas and steam supplied to the spiral heat exchange tube 800 flow spirally through the spiral heat exchange tube 800 and then flow into the first catalyst tube 200. The hydrocarbon gas and steam may be heated before being introduced into the first catalyst tube 200 by exchanging heat with combustion gas existing in the body 100 while moving through the spiral heat exchange tube 800. As such, it is possible to increase the efficiency of the combined reforming apparatus by using the heat of the combustion gas before the combustion gas is discharged to the outside from the body 100.

Figure 6:
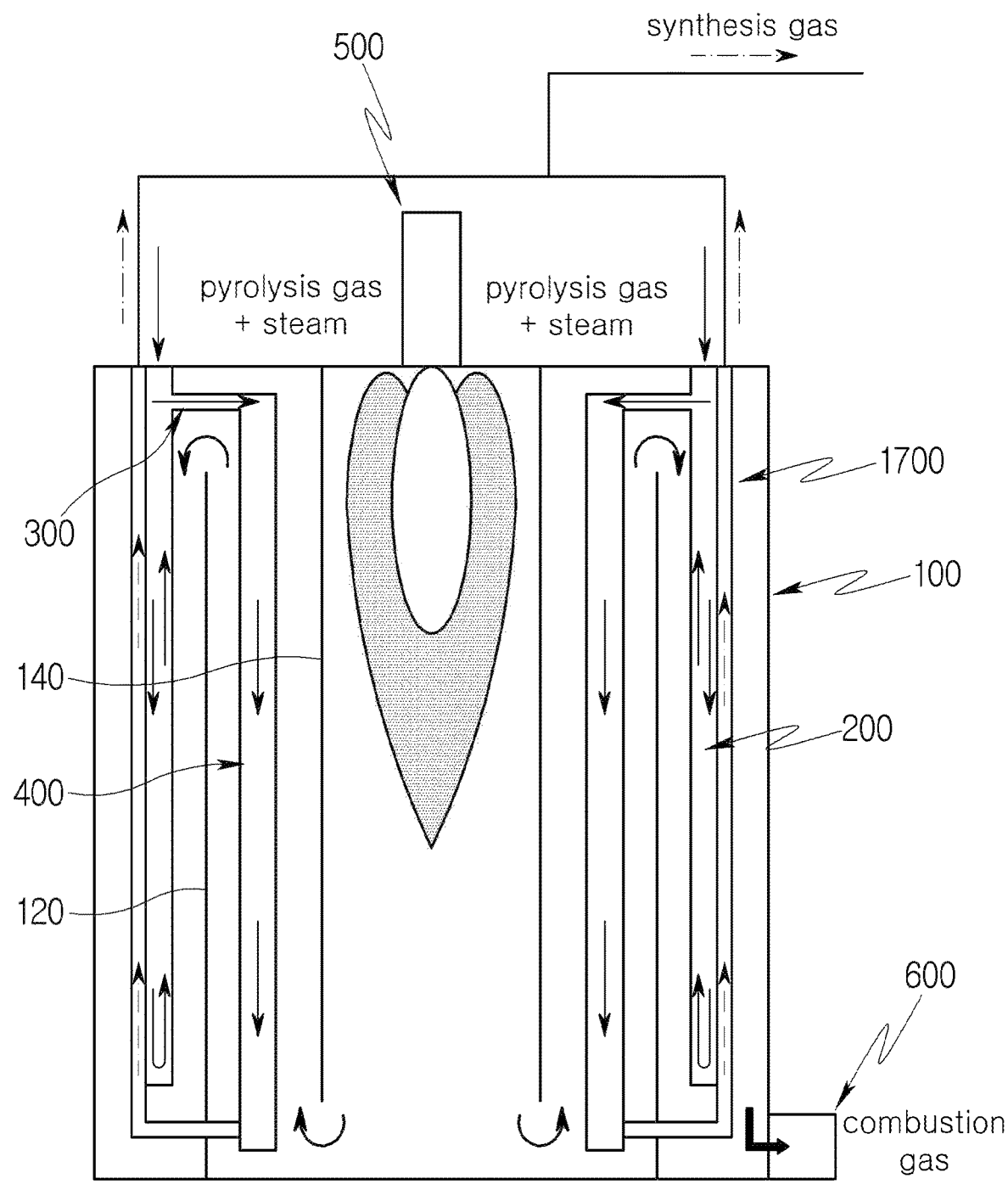
FIG. 6 is a cross-sectional view illustrating a combined reforming apparatus according to a third exemplary embodiment.

FIG. 6 is a cross-sectional view illustrating a combined reforming apparatus according to a third exemplary embodiment.

Because the combined reforming according to the third exemplary embodiment has the same structure as the combined reforming apparatus according to the first exemplary embodiment except for a synthesis gas discharge unit 1700, a redundant description of the same configuration will be omitted. Referring to FIG. 6, the synthesis gas discharge unit 1700 is in contact with the first catalyst tube 200 to be able to exchange heat with the first catalyst tube 200. That is, the synthesis gas discharge unit 1700 extends from one end of the second catalyst tube 400, then extends through the first wall 120, and extends in contact with and in parallel with the first catalyst tube 200. With this structure, the hydrocarbon gas and steam in the first catalyst tube 200 can receive heat from the synthesis gas as well as from the combustion gas. This is because the waste heat of the synthesis gas is used to improve the efficiency of the combined reforming apparatus before the synthesis gas is discharged to the outside of the body 100.

Figure 7:
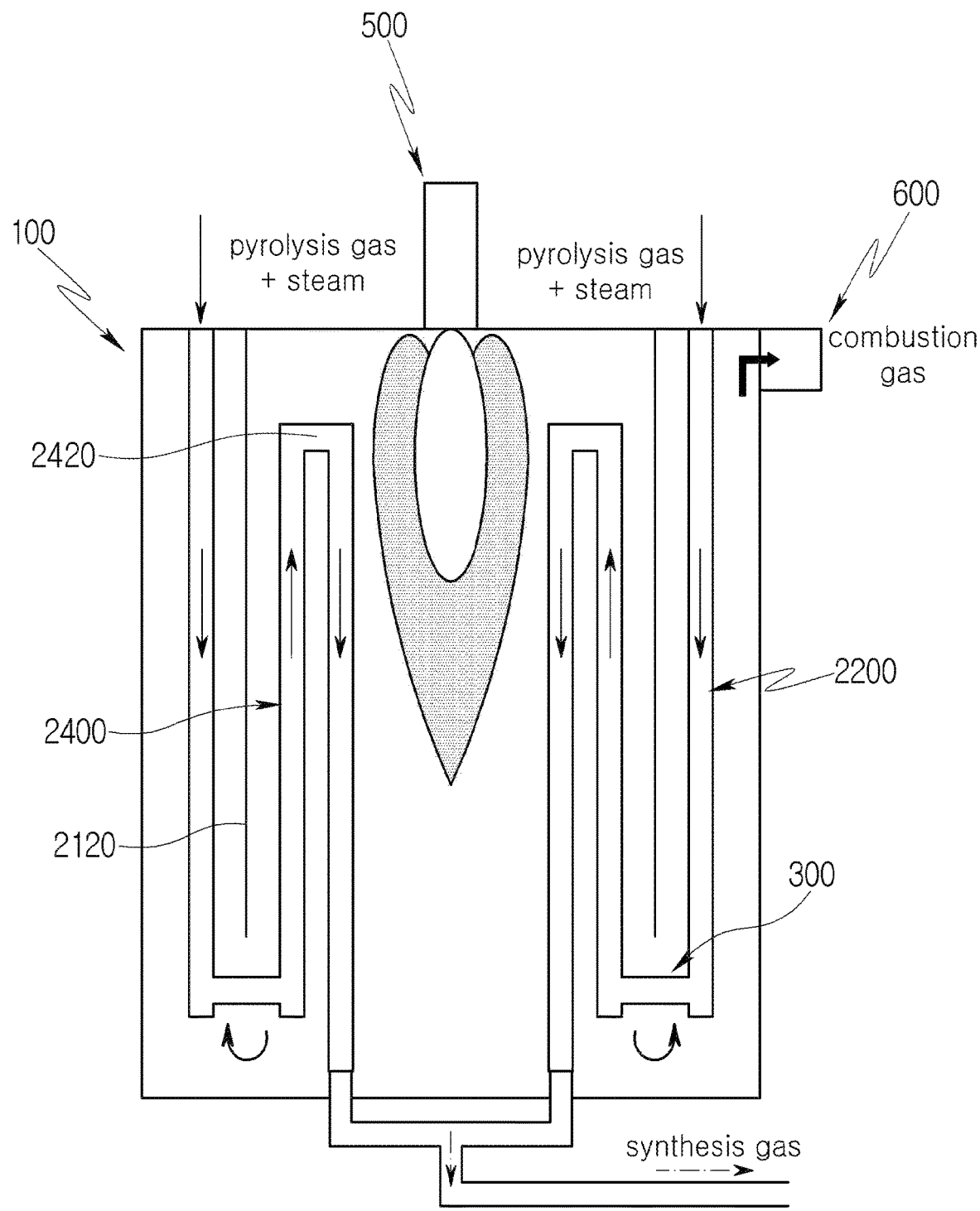
FIG. 7 is a cross-sectional view illustrating a combined reforming apparatus according to a fourth exemplary embodiment.

FIG. 7 is a cross-sectional view illustrating a combined reforming apparatus according to a fourth exemplary embodiment.

Because the combined reforming apparatus according to the fourth exemplary embodiment has the same structure as the combined reforming apparatus according to the first exemplary embodiment except that the second catalyst tube 2400 has a U-curved portion and the second wall is not included, a redundant description of the same configuration will be omitted.

Referring to FIG. 7, the combined reforming apparatus includes a plurality of first catalyst tubes 2200 and a plurality of second catalyst tubes 2400. The plurality of second catalyst tubes 2400 are arranged at intervals in the circumferential direction of the body 100, and the plurality of first catalyst tubes 2200 are arranged to surround the plurality of second catalyst tubes 2400. The plurality of first catalyst tubes 2200 and the plurality of second catalyst tubes 2400 extend vertically along the longitudinal direction of the body 100.

Here, unlike the first exemplary embodiment in which the first catalyst tube 200 has the U-curved portion 220, the second catalyst tube 2400 has a U-curved portion 2420. For example, each of the plurality of second catalyst tubes 2400 extends vertically upward from the lower side of the body 100, then is curved in a U shape at the upper end (i.e., U-curved portion 2420), and then extends vertically downward. The number of U-curved portions 2420 may be adjusted according to a catalyst reaction time. As the required catalyst reaction time increases, the number of U-curved portions 2420 may increase.

FIG. 7 illustrates a case in which the U-curved portion 2420 of the second catalyst tube 2400 extends along the radial direction of the body 100, but it is understood that this is only an example and other exemplary embodiments are not limited thereto. Alternatively, the U-curved portion 2420 may extend along the circumferential direction of the body 100 to make the combined reforming apparatus compact.

Figure 8:
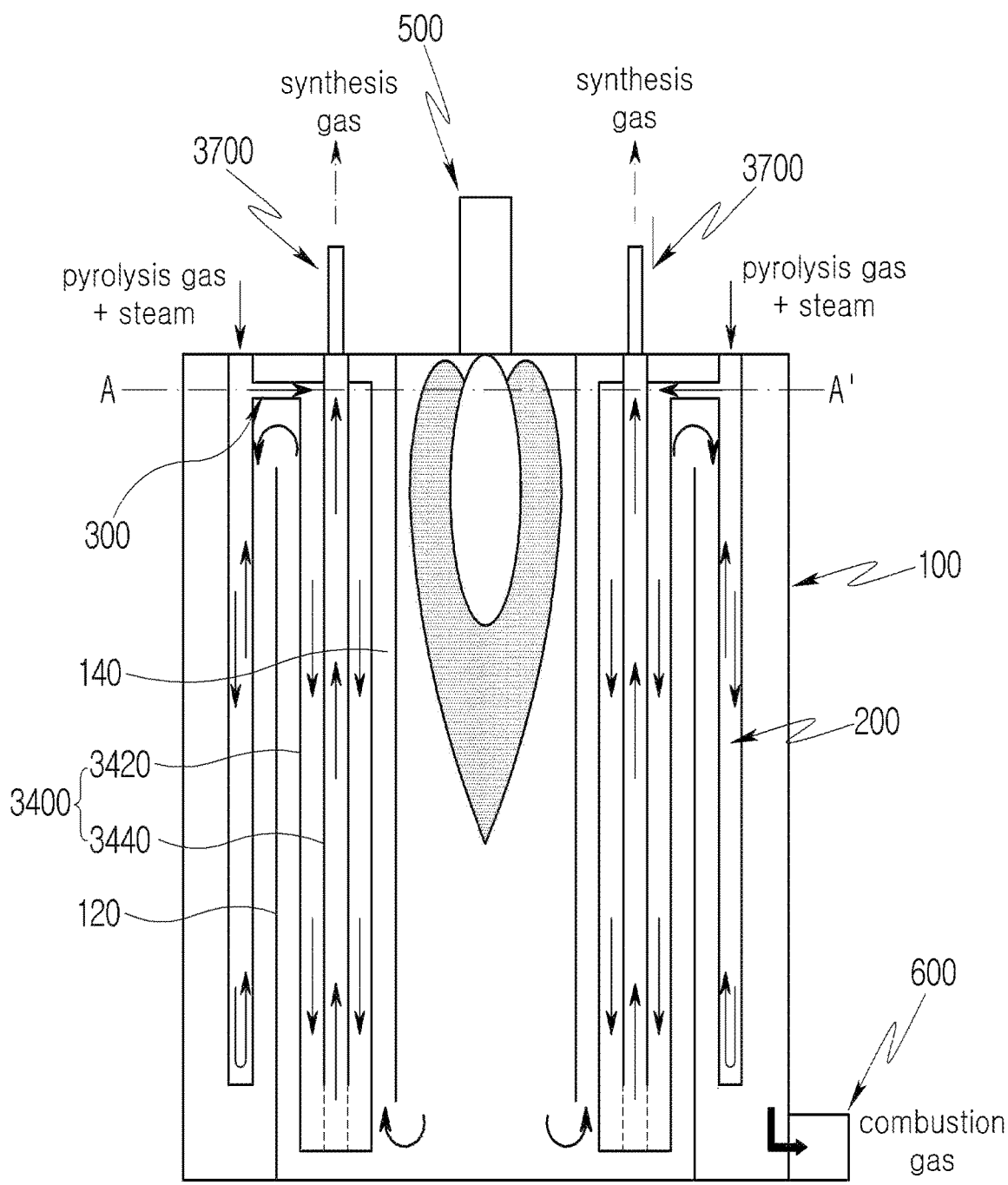
FIG. 8 is a cross-sectional view illustrating a combined reforming apparatus according to a fifth exemplary embodiment.
Figure 9:
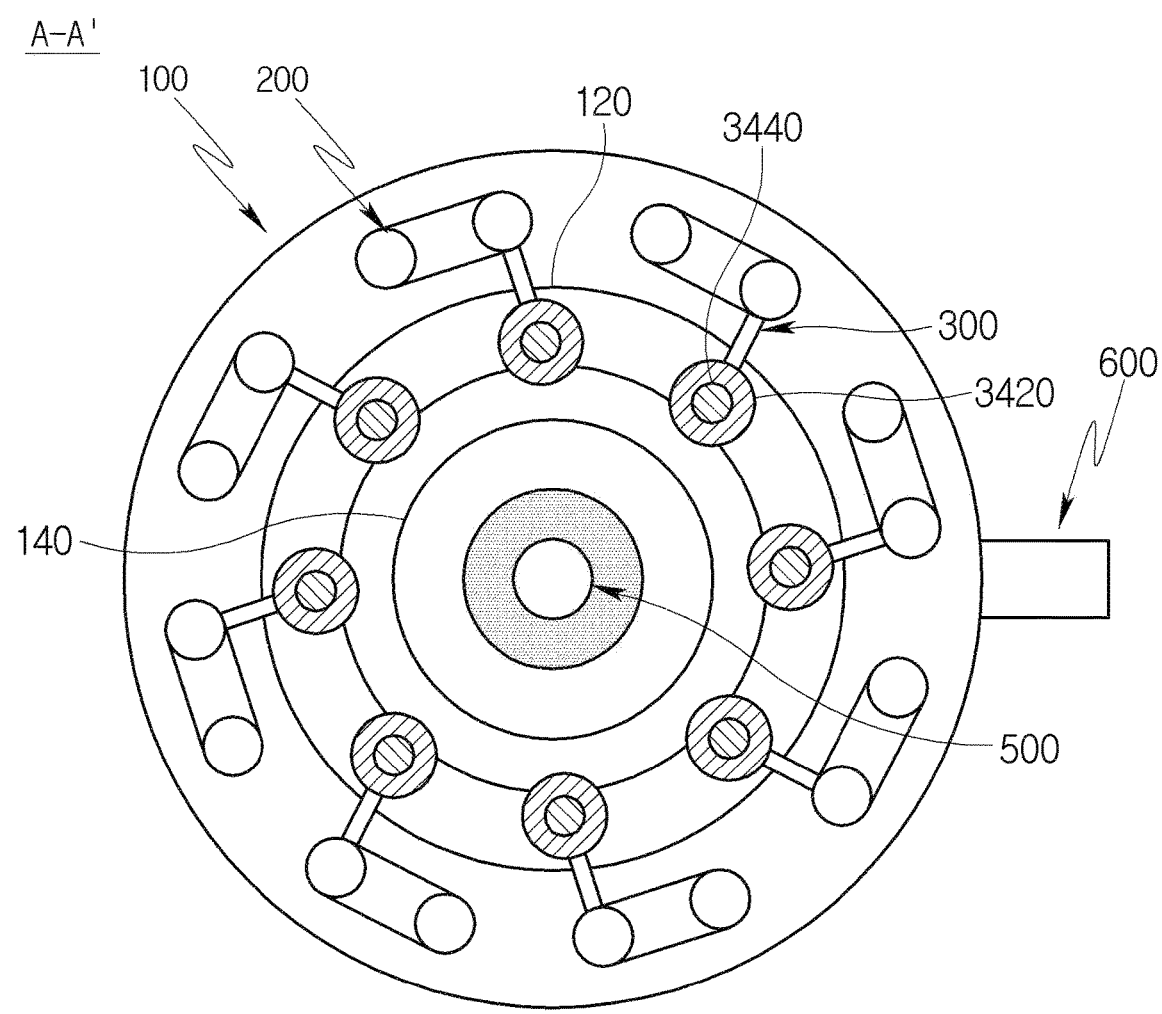
FIG. 9 is a cross-sectional view taken along line A-A' of FIG. 8.

A first wall 2120 is provided in the body 100. The first wall 2120 guides the flow of combustion gas discharged from the combustion unit 500 to effectively supply heat to the first catalyst tubes 2200 and the second catalyst tubes 2400. The first wall 2120 is disposed between the first catalyst tube 2200 and the second catalyst tube 2400 and vertically extends downward from the upper side of the body 100. Accordingly, the combustion gas discharged from the combustion unit 500 supplies heat to the second catalyst tube 2400 while flowing downward, and the combustion gas whose temperature is slightly lowered passes through a space under the first wall 2120. Then, the combustion gas flows upward to supply heat to the first catalyst tube 2200. After supplying heat to the first catalyst tube 2200 and the second catalyst tube 2400, the combustion gas is discharged to the outside by the combustion gas discharge unit 600 provided in the body 100. FIG. 8 is a cross-sectional view illustrating a combined reforming apparatus according to a fifth exemplary embodiment. FIG. 9 is a cross-sectional view taken along line A-A' of FIG. 8

FIG. 8 is a cross-sectional view illustrating a combined reforming apparatus according to a fifth exemplary embodiment. FIG. 9 is a cross-sectional view taken along line A-A' of FIG. 8.

Because the combined reforming apparatus according to the fifth exemplary embodiment has the same structure as the combined reforming apparatus according to the first exemplary embodiment except for a second catalyst tube 3400 which is a double tube, a redundant description of the same configuration will be omitted.

Referring to FIGS. 8 and 9, the second catalyst tube 3400 is a double tube including an outer tube 3420 and an inner tube 3440 disposed inside the outer tube 3420. The outer tube 3420 and the inner tube 3440 are configured to communicate with each other. Accordingly, gas and steam are introduced into the outer tube 3420 from the first catalyst tube 200 through the intermediate tube 300, and the steam reforming reaction of methane is performed while the gas and steam move downward through the outer tube 3420. Thereafter, the gas and steam passing through the outer tube 3420 flow into the inner tube 3440 configured to communicate with the outer tube 3420. Then, the gas and steam move upward through the inner tube 3440 so that methane in the gas may undergo a steam reforming reaction to generate synthesis gas. The reformed synthesis gas is discharged upward through the synthesis gas discharge unit 3700. This structure increases the reforming efficiency by increasing a methane reforming reaction time in the second catalyst tube 3400.

According to one or more exemplary embodiments, because two or more catalyst tubes reacting at different temperatures are disposed in a single body, hydrocarbons ($C_xH_y$) having two or more carbon atoms can be reformed into methane ($CH_4$) and the methane ($CH_4$) can be reformed into synthesis gas composed of hydrogen ($H_2$) and carbon monoxide (CO) at the same time. Accordingly, there is no need to additionally install a preliminary reformer, thereby simplifying the structure and process for gas reforming.

In addition, because the first catalyst tube or the second catalyst tube has at least one U-curved portion depending on a required time for gas reforming, it is possible to adjust the total reaction time.

In addition, it is possible to heat hydrocarbon gas and steam supplied to the first catalyst tube using waste heat of combustion gas or synthesis gas.

Further, the one or more exemplary embodiments can be used for reforming pyrolysis gas generated during pyrolysis of wastes in which the pyrolysis gas contains a large amount of hydrocarbons having two or more carbon atoms.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A combined reforming apparatus comprising:
   a body;
   a first catalyst tube disposed inside the body and reacting at a first temperature to reform hydrocarbons having two or more carbon atoms into methane (CH4);
   a second catalyst tube disposed inside the body, connected to the first catalyst tube, and reacting at a second temperature higher than the first temperature to reform methane (CH4) into synthesis gas comprising hydrogen (H2) and carbon monoxide (CO); and
   a combustion unit configured to supply heat to the first and second catalyst tubes,
   wherein combustion gas discharged from the combustion unit supplies heat to the second catalyst tube and then to the first catalyst tube,
   wherein the first catalyst tube and the second catalyst tube are arranged in parallel along a longitudinal direction of the body, and
   wherein a first wall extending from a first side of the body is disposed between the first catalyst tube and the second catalyst tube, and a second wall extending from a second side of the body is disposed more inward than the second catalyst tube.

2. The combined reforming apparatus according to claim 1,
   wherein pyrolysis gas generated through pyrolysis of waste and steam are supplied to the first catalyst tube.

3. The combined reforming apparatus according to claim 1,
   wherein the combustion gas is discharged through a center portion of the body.

4. The combined reforming apparatus according to claim 3, wherein the second catalyst tube is radially more inner than the first catalyst tube.

5. The combined reforming apparatus according to claim 4,
   wherein the first catalyst tube includes a plurality of first catalyst tubes and the second catalyst tube includes a plurality of second catalyst tubes.

6. The combined reforming apparatus according to claim 5,
   wherein the plurality of second catalyst tubes are arranged at intervals along a circumferential direction of the body, and the plurality of first catalyst tubes are arranged to surround the plurality of second catalyst tubes.

7. The combined reforming apparatus according to claim 6,
   wherein the number of the plurality of first catalyst tubes is equal to the number of the plurality of second catalyst tubes, and the plurality of first catalyst tubes are connected to the plurality of second catalyst tubes, respectively.

8. The combined reforming apparatus according to claim 1,
   wherein the first catalyst tube has a U-curved portion.

9. The combined reforming apparatus according to claim 8,
   wherein the U-curved portion extends along a circumferential direction of the body.

10. The combined reforming apparatus according to claim 1, wherein the second catalyst tube has a U-curved portion, the U-curved portion extending along a circumferential direction of the body.

11. The combined reforming apparatus according to claim 1,
    wherein the body includes a combustion gas discharge unit through which the combustion gas is discharged outside.

12. The combined reforming apparatus according to claim 1,
    wherein the second catalyst tube is connected to a synthesis gas discharge unit through which the synthesis gas is discharged outside.

13. The combined reforming apparatus according to claim 12,
    wherein the synthesis gas discharge unit is in contact with the first catalyst tube to perform heat exchange with the first catalyst tube.

14. The combined reforming apparatus according to claim 1, further comprising:
    a spiral heat exchange tube configured to be wound around an outer circumferential surface of the body or to be wound around an inner circumferential surface of the body.

15. The combined reforming apparatus according to claim 14,
    wherein hydrocarbon gas and steam are supplied to the spiral heat exchange tube, move spirally through the spiral heat exchange tube, and then flow into the first catalyst tube.

16. The combined reforming apparatus according to claim 15, wherein the hydrocarbon gas and steam are heated before being introduced into the first catalyst tube by exchanging heat with combustion gas existing in the body while moving through the spiral heat exchange tube.

17. The combined reforming apparatus according to claim 1,
    wherein the second catalyst tube is a double tube comprising an outer tube and an inner tube that communicates with the outer tube and is disposed inside the outer tube.

18. A combined reforming apparatus comprising:
    a body;
    a first catalyst tube disposed inside the body and reacting at a first temperature to reform hydrocarbons having two or more carbon atoms into methane (CH4);
    a second catalyst tube disposed inside the body, connected to the first catalyst tube, and reacting at a second temperature higher than the first temperature to reform methane (CH4) into synthesis gas comprising hydrogen (H2) and carbon monoxide (CO); and a combustion unit configured to supply heat to the first and second catalyst tubes, wherein the second catalyst tube is connected to a synthesis gas discharge unit through which the synthesis gas is discharged outside, wherein the synthesis gas discharge unit is in contact with the first catalyst tube to perform heat exchange with the first catalyst tube.

19. A combined reforming apparatus comprising:

a body;

a first catalyst tube disposed inside the body and reacting at a first temperature to reform hydrocarbons having two or more carbon atoms into methane (CH4);

a second catalyst tube disposed inside the body, connected to the first catalyst tube, and reacting at a second temperature higher than the first temperature to reform methane (CH4) into synthesis gas comprising hydrogen (H2) and carbon monoxide (CO); and a combustion unit configured to supply heat to the first and second catalyst tubes, wherein the second catalyst tube is a double tube comprising an outer tube and an inner tube that communicates with the outer tube and is disposed inside the outer tube.

* * * * *